United States Patent [19]

Nicola, Jr. et al.

[11] Patent Number: 4,945,854
[45] Date of Patent: Aug. 7, 1990

[54] APPARATUS FOR THE DISTRIBUTION OF A FOAMABLE REACTION MIXTURE UPON A MOVING BASE

[75] Inventors: William J. Nicola, Jr., Burgettstown; Edward A. Miller, Coraopolis, both of Pa.

[73] Assignee: Mobay Corporation, Pittsburgh, Pa.

[21] Appl. No.: 324,839

[22] Filed: Mar. 17, 1989

[51] Int. Cl.⁵ .............................................. B05B 3/00
[52] U.S. Cl. .................................... 118/324; 118/300; 118/302; 425/100
[58] Field of Search ............... 118/300, 302, 323, 324, 118/325; 239/428.5, 429; 425/100

[56] References Cited

U.S. PATENT DOCUMENTS

| | | | |
|---|---|---|---|
| 2,111,761 | 3/1938 | Eckert | 118/302 |
| 2,364,264 | 12/1944 | Yeomans | 118/324 |
| 2,922,869 | 1/1960 | Giannini | 118/302 |
| 3,009,209 | 11/1961 | Weinbrenner | 118/323 |
| 3,402,695 | 9/1968 | Baker | 118/324 |
| 4,135,008 | 1/1979 | Workens | 118/300 |
| 4,445,243 | 5/1984 | Bohrn | 118/324 |
| 4,846,099 | 7/1989 | Krippl | 118/323 |

Primary Examiner—Jay H. Woo
Assistant Examiner—Jeremiah F. Durkin, II
Attorney, Agent, or Firm—Joseph C. Gil

[57] ABSTRACT

The present invention is directed to an apparatus for the distribution of a foamble reaction mixture upon a moving base. The present invention is directed to the discovery that by injecting small amounts of air into both ends of a conventional pipe-type dispenser, the operation time without any plugging can be substantially increased. The air flow prevents build-up of reaction mixture around the dispensing holes.

1 Claim, 1 Drawing Sheet

APPARATUS FOR THE DISTRIBUTION OF A FOAMABLE REACTION MIXTURE UPON A MOVING BASE

BACKGROUND OF THE INVENTION

Various devices for distributing foamable reaction s mixtures upon moving substrates are known. Such devices are used in the production of rigid polyurethane and/or polyisocyanurate foam boards and metal-faced panels. Typical of the known devices are traversing pipes, stationary multi-stream pipes and stationary spreader bars having spray nozzles. One recurring problem with known equipment is that the foamable reaction mixture cannot be distributed over the entire moving substrate with the result that the foam being formed is forced to flow and meld together, causing the formation of knit lines, irregular cell orientation and voids or air pockets. In addition, existing devices are frequently plugged with reaction mixture after a relatively short time causing shut down of the equipment until the plugging can be removed. Typical of the prior art devices are those described in U.S. Application Ser. No. 236,061, filed on August 24, 1988 now U.S Pat. No. 4,900,593 and No. 156,775, filed on February 16, 1988, now U.S. Pat No. 4,846,099.

DESCRIPTION OF THE INVENTION

The present invention is directed to the discovery that by injecting small amounts of air to both ends of a conventional pipe-type dispenser, the operating time without any plugging can be substantially increased. The air flow prevents build-up of reaction mixture around the dispensing holes and at the closed end of the dispenser. With conventional pipe dispensers, plugging occurs within 2 to 3 minutes. With the device of the present invention, even fast reacting mixtures can be used without plugging after 90 minutes. In addition, both the chemical flow and the chemical mixing are improved.

More particularly, the present invention is directed to an apparatus for the distribution of a foamable reaction mixture upon a moving base comprising:

(a) a mixing device having at least one inlet for receiving foam raw materials and an outlet for the foamable reaction mixture, (b) an elongated hollow, pipe-like applicator connected at one end to said outlet and at the other end to an air source, said applicator having a multiplicity of holes along the length thereof, said holes opening above said base, (c) means for transporting said mixture through said mixing device, into said applicator, and through said holes, (d) means for simultaneously passing air from said air source into said applicator and through said holes, and (e) means for simultaneously passing air through said outlet, into said applicator and through said holes.

The applicator can be stationary or it can traverse over the moving base. Two applications may also be used with a single mixhead for broad distribution without a traverse.

Figure 1:
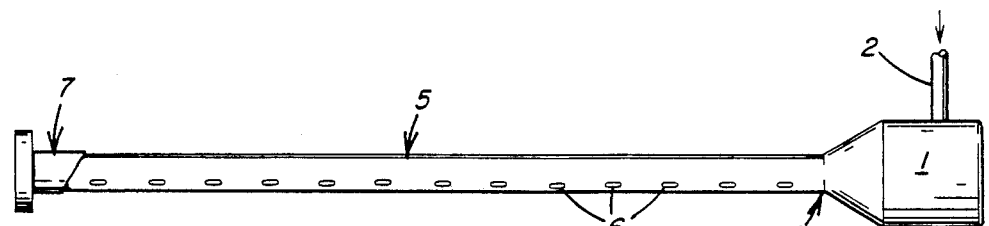
FIG. 1 represents a known distributing device.

Reference will now be made to the drawings. FIG. 1 represents a prior art distribution device. The apparatus consists of a mixing device 1, having an inlet 2 for one of the reactive components and an inlet 3 for another reactive component. The mixing device 1 has an outlet 4 for the foamable reaction mixture. The outlet 4 is connected to an applicator 5 which has a multiplicity of holes 6 in its lower surface. The end of the applicator 5 opposite the outlet 4 is closed with a plug 7.

Figure 2:
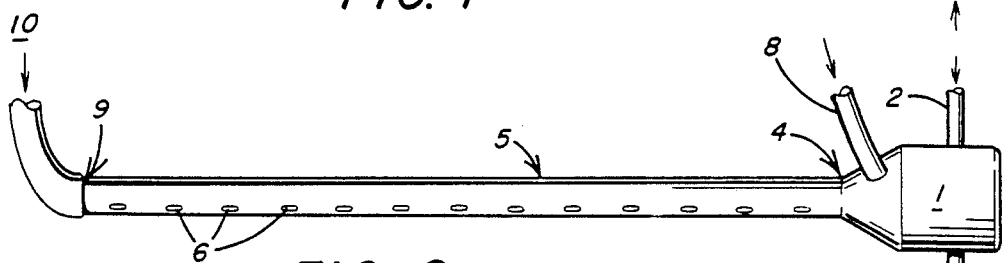
FIG. 2 represents the distributing device of the present invention.
Figure 3:
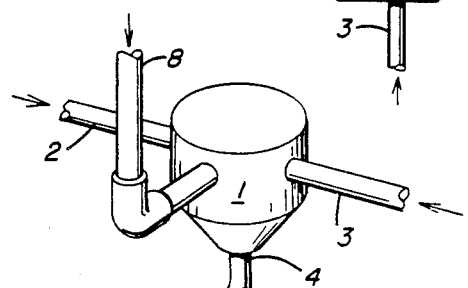
FIG. 3 is a perspective view of the device of the s present invention in operation.

FIG. 2 represents the apparatus of the present invention. The apparatus differs from the prior art apparatus in two key features. The mixing device 1 is provided with an air inlet 8 through which air can be fed into the mixing device. The end, 9 of the applicator 5 opposite the outlet 4 is connected to an air source 10. FIG. 3 shows the apparatus in operation. The foamable reaction mixture passes through the applicator over the moving base 11 in the form of curtains 12 to form a layer 13 which foams to form the final product.

While the drawings have shown the applicator to be in the form of a pipe, such is not essential. Any hollow device could be used. The applicators are preferably constructed of carbon steel, but other metals and even plastics can be used. The applicator length, number of holes, hole size and hole spacing can vary over wide limits depending upon the chemical output and viscosity. Chemical throughputs of from 10 to 50 pounds per minute are typical, with air throughputs of from 0.2 to 5 scfm (standard cubic feet per minute) through each end of the applicator being preferred. The air can be supplied via any suitable compressed air source. In one particularly preferred embodiment, the air is metered from the compressed air source through air flow meters which are in turn connected to the air feed lines 8 and 10. Commercially available flow meters, which can read scfm, such as Model #10A6131N from Fischer and Porter, are eminently suitable for use herein. Typical applicator lengths range from 10 to 30 cm, with from 15 to 30 holes of from 1.3 to 3.5 mm diameter being typical. The diameter of the applicator can also vary over a wide range with typical inside diameters being in the range of from 5 to 30 mm. Any conventional foam mixhead can be used herein. Typically, the HK-line of mixheads commercially available from Hennecke Machinery are used.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An apparatus for the distribution of a foamable reaction mixture upon a moving base comprising:

(a) a mixing device having at least one inlet for receiving foam raw materials and an outlet for the foamable reaction mixture, (b) an elongated hollow, pipe-like applicator connected at one terminal end to said outlet and at the other terminal end to an air source, said applicator having a multiplicity of holes along the length thereof, said holes opening above said base, (c) means for transporting said mixture through said mixing device, into said applicator, and through said holes, (d) means for simultaneously pumping air from said air source through said other terminal end into said applicator and through said holes, and (e) means for simultaneously pumping air through said outlet, into said applicator and through said holes.

* * * * *